(12) United States Patent
Martin et al.

(10) Patent No.: US 7,833,373 B2
(45) Date of Patent: Nov. 16, 2010

(54) GUIDE FOR GUIDING REINFORCEMENT THREADS SPRAYED ONTO A SURFACE DURING MANUFACTURE OF A TIRE

(75) Inventors: Pascal Martin, Corent (FR); Dominique Cordaillat, Brindas (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 575 days.

(21) Appl. No.: 11/979,349

(22) Filed: Nov. 1, 2007

(65) Prior Publication Data
US 2008/0277046 A1  Nov. 13, 2008

(30) Foreign Application Priority Data
Nov. 2, 2006  (FR) ................................. 06 09646
Nov. 2, 2006  (FR) ................................. 06 09648

(51) Int. Cl.
*B29D 30/08* (2006.01)
(52) U.S. Cl. ..................... 156/117; 156/123; 156/181; 156/397; 156/441
(58) Field of Classification Search ................ 156/117, 156/123, 181, 441, 397
See application file for complete search history.

(56) References Cited

U.S. PATENT DOCUMENTS 3,894,906 A * 7/1975 Pearce et al. ................ 156/440
4,952,259 A * 8/1990 Debroche et al. ........... 156/117
4,992,123 A * 2/1991 Cave et al. .................. 156/161
5,281,289 A * 1/1994 Debroche et al. ........... 156/117
5,362,343 A * 11/1994 Debroche .................... 156/117
5,395,476 A * 3/1995 Debroche et al. ........... 156/397
5,951,815 A * 9/1999 Debroche .................... 156/397
5,971,050 A * 10/1999 Debroche .................... 156/397
6,167,934 B1 * 1/2001 Debroche .................... 156/397

FOREIGN PATENT DOCUMENTS

EP          0 845 348          6/1998
EP          0 845 349          6/1998

* cited by examiner

*Primary Examiner*—John L Goff
*Assistant Examiner*—David Simmons
(74) *Attorney, Agent, or Firm*—Buchanan Ingersoll & Rooney PC

(57) ABSTRACT

Device for manufacturing a reinforcement from a thread laid directly in its final position by spraying lengths of the thread onto a receiving surface. The thread lengths are delivered from a conduit to a guide as the conduit rotates about an axis. The guide includes deflectors forming therebetween a slot having a thread inlet orifice and a thread spray (discharge) orifice spaced apart along the guide's height. The separation between the deflectors narrows toward the spray orifice, wherein the deflectors form therebetween an angle in the range of 3° and 7° when measured at any point along the height of the slot.

16 Claims, 5 Drawing Sheets

GUIDE FOR GUIDING REINFORCEMENT THREADS SPRAYED ONTO A SURFACE DURING MANUFACTURE OF A TIRE

The present application claims priority under 35 U.S.C. §119 to Patent Application No. 06/09648 and Application No. 06/09646 filed in France on Nov. 2, 2006, respectively, the contents of which are incorporated by reference.

BACKGROUND OF THE INVENTION

The invention relates in particular to the manufacture of tires and is more precisely concerned with the manufacture of reinforcements.

Known in the prior art is a manufacturing method in which such reinforcements are manufactured directly on the tire preform from a continuous thread by spraying the thread in the manner of a whip rather than in the form of plies that are incorporated when the tire is being assembled.

The term thread is to be understood in its broadest sense, covering a monofilament, a multifilament, a twisted cord or a folded yarn or equivalent assembly, this irrespective of the material of which the thread is made or the treatment it may undergo, for example a surface treatment to encourage it to bond closely with rubber, or alternatively a rubberizing treatment encasing the thread in a coat of rubber to allow it to adhere directly to the support when it is sprayed.

A device such as this is illustrated in publication EP 248 301 (corresponding to Debroche et al. U.S. Pat. No. 4,952,259), and FIG. 1 illustrates the main components which make up this type of apparatus.

The thread 1 is introduced into the device from a supply source (not depicted). The apparatus sprays lengths of thread onto a receiving surface Q (not depicted) which may with equal preference be formed by the crown region of a tire preform or by a separate support ring, or, alternatively still, by a flat surface.

The device comprises:
feed means 11 for feeding thread 1 from a source of thread,
a rotary conduit 2 fixed to a shaft 20 constituting the axis of rotation R of the conduit, so that the outer radial end 21 of the conduit is directed substantially radially with respect to the axis of rotation, the conduit receiving the thread 1 via its central end 22, which is the opposite end to the outer radial end 21, from the feed means, the thread leaving via the outer radial end, the feed means controlling the linear rate of advance of the thread inside the rotary conduit,
means for rotating the rotary conduit about an axis R, and
thread cutting means (not depicted) acting on the thread in such a way as to release a length for each revolution of the rotary conduit.

This device may further comprise a thread guide 4, to receive and guide lengths of thread, as described in publication EP 248301, or alternatively in publications EP 845 348 and EP 845 349.

Hence, for further details regarding the layout of the devices of the known type, it is suggested that the abovementioned publications be consulted.

SUMMARY OF PREFERRED EMBODIMENT

The invention is more particularly concerned with the thread guide, and the way in which the thread guide is arranged with respect to the thread spraying means. According to the prior art, the purpose of the thread guide is to impose a precise path on the length of thread before it "lands" on the receiving surface Q. During its free travel, the length of thread enters the thread guide in such a way as to have its final course adjusted before it is sprayed onto the receiving surface.

The subject of the invention is a thread guide in which the geometric characteristics are optimized so as to provide optimum guidance of the thread towards the receiving surface.

BRIEF DESCRIPTION OF THE DRAWINGS

The details of the invention are explained in the description which follows, with reference to FIGS. 1 to 6 in which.

DESCRIPTION OF A PREFERRED EMBODIMENT OF THE INVENTION

Figure 1:
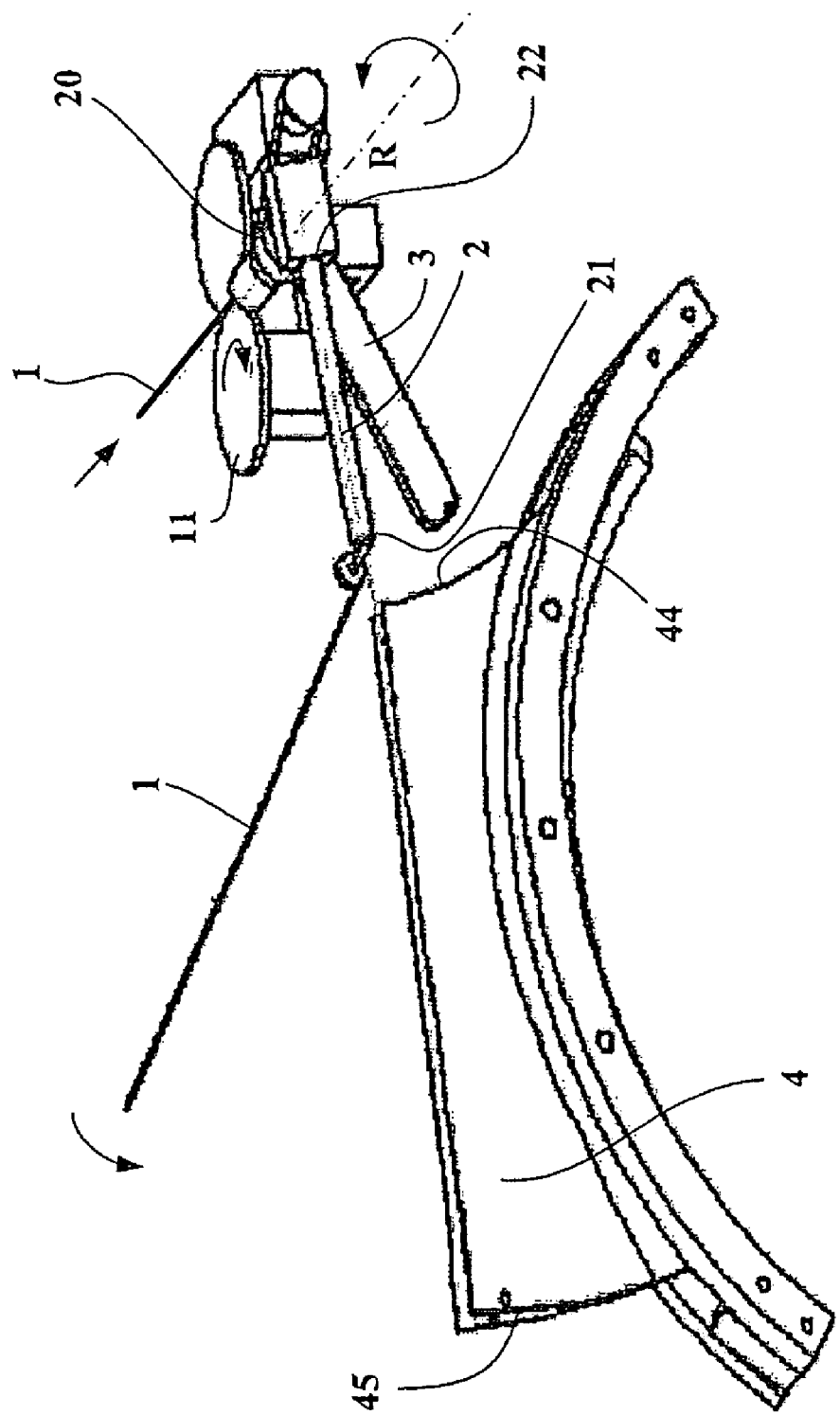
FIG. 1, already mentioned, shows a perspective schematic view of a laying means and of a thread guide to which the invention relates.

The thread guide depicted in FIG. 1 is made up of two deflectors positioned with respect to the rotary conduit in such a way as to receive the length of thread in the plane of rotation of the rotary conduit. The plane of rotation of the rotary conduit is identified by the letter P. The two deflectors delimit an elongate interior opening positioned in the plane of rotation P and are arranged in such a way as to leave between them a slot comprising an inlet orifice and a spray orifice, through which orifices the length of thread can pass towards the receiving surface Q, and are positioned in such a way that the separation between the deflectors narrows towards the spray orifice.

Each deflector may, at the spray orifice end, have a curved edging bringing it closer to the receiving surface.

It is also possible to contrive for the two deflectors to be in contact with one another, at least at isolated points at the spray orifice end. When this is the case, it is necessary to provide means for regulating the pressure exerted by the deflectors towards one another as the length of thread passes and to contrive for the deflectors to be able to move apart as the length of thread passes.

Figure 2:
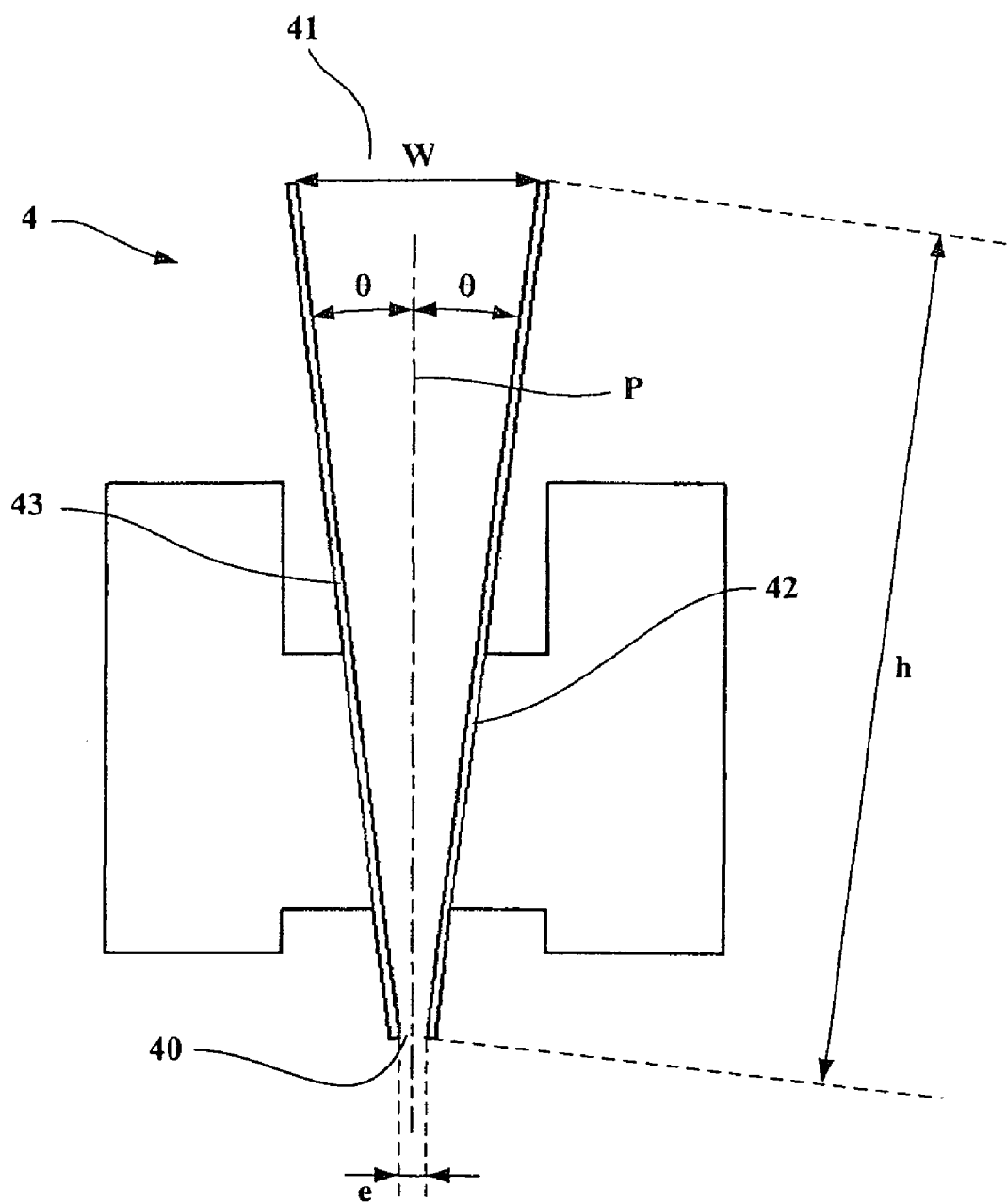
FIG. 2 shows a sectioned schematic view of a guide showing the main geometric parameters liable to influence the laying quality.

FIG. 2, which shows a sectioned view of a thread guide of the type to which the invention relates, provides a visual indication of the respective positions of the two deflectors 42 and 43, positioned with respect to the plane P with a given angular aperture θ. The length of thread enters a slot formed by the deflectors via the inlet orifice or aperture 41 and re-emerges via the spray orifice 40. The separation between the deflectors at the aperture 41 is denoted W and the separation at the spray orifice 40 is denoted e. The height of the walls of the deflectors is denoted h. The length of the length of thread is denoted L.

In the longitudinal direction, the thread guide is directed substantially in the radial direction of the conduit 2, when the conduit is in the angular configuration that coincides precisely with the moment at which the length of thread is released. The slot of the thread guide has one end conventionally termed the inner radial end 44 which is that part of the thread guide closest to (proximate) the end 21 of the conduit 2, and an outer radial end 45 which is that part radially furthest (remote) from the end 21 of the conduit 2. The thread passes through the slot in a direction transversely of a longitudinal direction of the slot which extends from the inner end 44 to the outer end 45.

The subject of the invention is concerned with determining the geometric characteristics of the thread guide, among which the choice of the angle θ and of the height h has to be made with particular care in order to achieve a satisfactory result.

Figure 3:
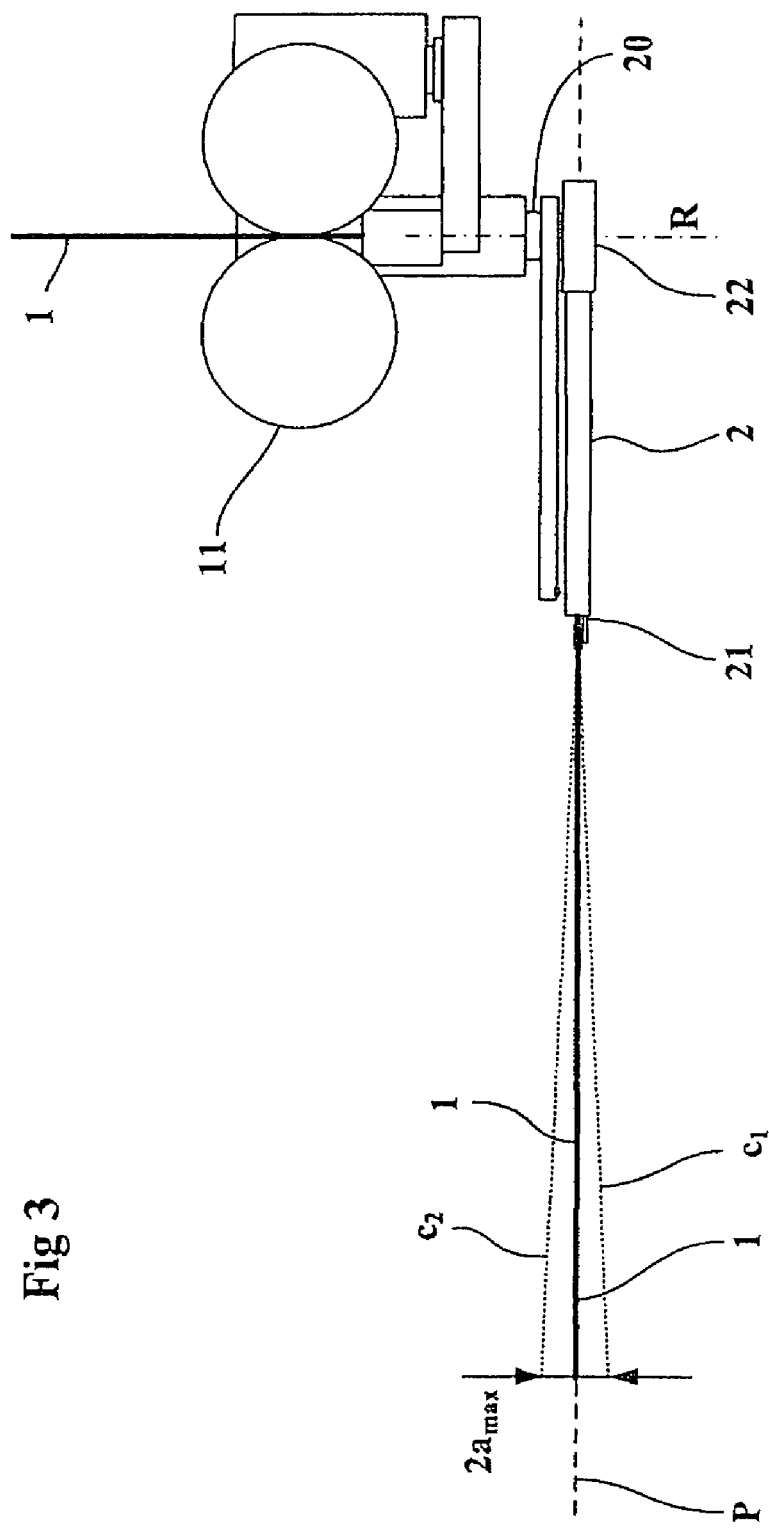
FIG. 3 is a schematic view of a laying device, from above.

Indeed it has been found experimentally that, contrary to that which was described in the aforementioned publications, the thread and the length of thread do not travel strictly in the plane P. Thus, it has been found that the thread 1 oscillates on each side of the plane P, and that the amplitude a of this oscillation increases radially towards that part of the length of thread that is furthest from the exit 21 of the conduit 2, as has been depicted in FIG. 3. At the end of the thread, the maximum value of the amplitude of this oscillation is denoted $a_{max}$. In addition, the oscillation increases as the length of the thread increases, and the value of $a_{max}$ is therefore at its maximum just before the thread is cut and the length of thread begins its free travel. The thread oscillates in a range $2a_{max}$ on each side of the plane P within the limits $c_1$ and $c_2$ depicted in dotted line in FIG. 3.

The value of this maximum amplitude is dependent on the nature of the thread, on the length of the length of thread, and on the rotational speed Ω of the conduit 2. By way of indication, an amplitude $a_{max}$ of the order of +/−5 mm is measured for a cemented length of type 9-23 thread measuring 450 mm in length. For a thread of the same length, but not coated with cement, the amplitude $a_{max}$ is +/−10 mm. Likewise, when the length of these two threads is 600 mm, the amplitudes of the oscillation are +/−10 mm and +/−15 mm, respectively.

For a cemented 2+2−28 thread measuring 500 mm in length, the amplitude $a_{max}$ is +/−20 mm, and for the same thread of the same length but without the cement coating, the amplitude of the oscillation $a_{max}$ is +/−15 mm.

This oscillation is measured for example using means employing stroboscopic lights or alternatively high-speed image recording means.

Steps should be taken to ensure that the value W which determines the aperture of the thread guide at a given point along the longitudinal direction of the thread guide exceeds the value of the amplitude of the oscillation of the thread or of the length of thread entering the thread guide at this point so that the length of thread enters the thread guide without knocking against the upper edging of the thread guide.

Hence, the choice of values for the angular aperture θ and for the height h of the deflectors which determine the value of the aperture needs to be made within very precise ranges of values in order to obtain good laying results.

According to the invention, it has been found that the value of the angle θ needs to range between 3° and 7° of angle, so that the thread can be guided in the thread guide and pass through the spray orifice with enough speed that it can whip to the receiving surface in order to stick thereto.

It is actually found that, for a given value W, too low a value of the angle θ, below 3°, means that the height of the deflectors has to be increased, which leads to an increase in friction between the length of thread and the walls of the deflectors. This then results in a loss in the kinetic energy of the length of thread, leading to a reduction in the speed of the length, which will then, having passed through the spray orifice, have difficulty sticking effectively to the receiving surface Q.

Conversely, still for a given value W, too high a value of the angle θ has the effect of causing the length of thread to knock against the wall of the deflectors and be bounced onto the opposite wall of the deflector, again resulting in a loss in the kinetic energy of the length of thread leading, as before, to insufficient adhesion of the thread to the receiving surface Q.

Thus, choosing the angular value for the aperture from this narrow range between 3° and 7° allows control over the speed at which the length of thread whips over its entire length, and therefore guarantees good adhesion of the length to the receiving surface Q.

Knowing the value of the amplitude a of the oscillation, bounded by the limits $c_1$ and $c_2$, it is then possible to determine the value of the height h of the deflectors 42 and 43. As a general rule, attempts will be made to have a value h as low as possible in order to reduce friction or contact between the length of thread and the walls of the deflectors. However, when considering the limit values for the angle θ, this height h cannot simply be reduced without due consideration because otherwise the value of the aperture W will be less than the value of the amplitude a of the oscillation.

The relationship between these magnitudes is obtained by a simple calculation in which the aim is to ensure that $W \geq 2 \times a$ and in which $W = e + 2 \times h \times \sin θ$, thereby making it possible to determine the lower value of the height h at each point along the thread guide in its longitudinal direction as a function of the value of a and of the angular aperture θ, namely:

$$h \geq \frac{2 \times a - e}{2 \times \sin θ}$$

Thus, for a value e of 4 mm, a value a of 20 mm and an angle θ of 3°, the height h needs to be greater than about 350 mm and, for the same values of e and a, but for an angular aperture θ of 7°, the height h needs to be greater than about 150 mm.

Finally, it will be seen that, when this relationship is observed, it is possible to vary the shape and the geometry of the thread guide in such a way as to optimize laying performance.

As stated hereinabove, the amplitude of the oscillation of the thread increases in the direction away from the exit 21 from the conduit, and this amplitude $a_{max}$ is at a maximum at that end of the thread that is radially furthest from the axis of rotation of the conduit 2.

As a result, for the same value of the angular aperture θ, it is possible to reduce the value of the height h as the value a of the amplitude of the oscillation decreases. Put differently, this allows the thread guide to be designed in such a way that the height of the walls of the deflectors increases in the longitudinal direction of the thread guide from the inner end 44 towards the outer end 45.

This arrangement proves to be particularly advantageous in that the kinetic energy of that part of the length of thread which lies radially at the same end as the exit 21 from the conduit 2 is lower than that of the part of the length which is radially furthest away. By reducing the height of the deflectors in this region it is then possible to reduce the dissipation of energy caused by the passage through the thread guide and to optimize the conditions under which this part of the length of thread is laid.

Still in the same scheme of things it is also possible, for a given deflector height h, to vary the angle θ between its two limit values of 3° and 7°, the angle increasing in the longitudinal direction of the thread guide from the inner end 44 towards the outer end 45.

Finally, it is also possible to conceive of varying the angle θ over the height of the deflector by contriving to have a relatively wide angle θ at the same end as the aperture 41 and which decreases towards the spray orifice 40. The purpose of this arrangement is to improve the laying precision. The angle θ can therefore vary from 7° at the aperture to 3° at the spray orifice.

Of course, these technical choices can also be combined provided that the angular aperture θ and the height of the walls remain within the limits stated in the foregoing paragraphs. It is thus possible to have a constant height h and a constant angular aperture θ.

Figure 4:
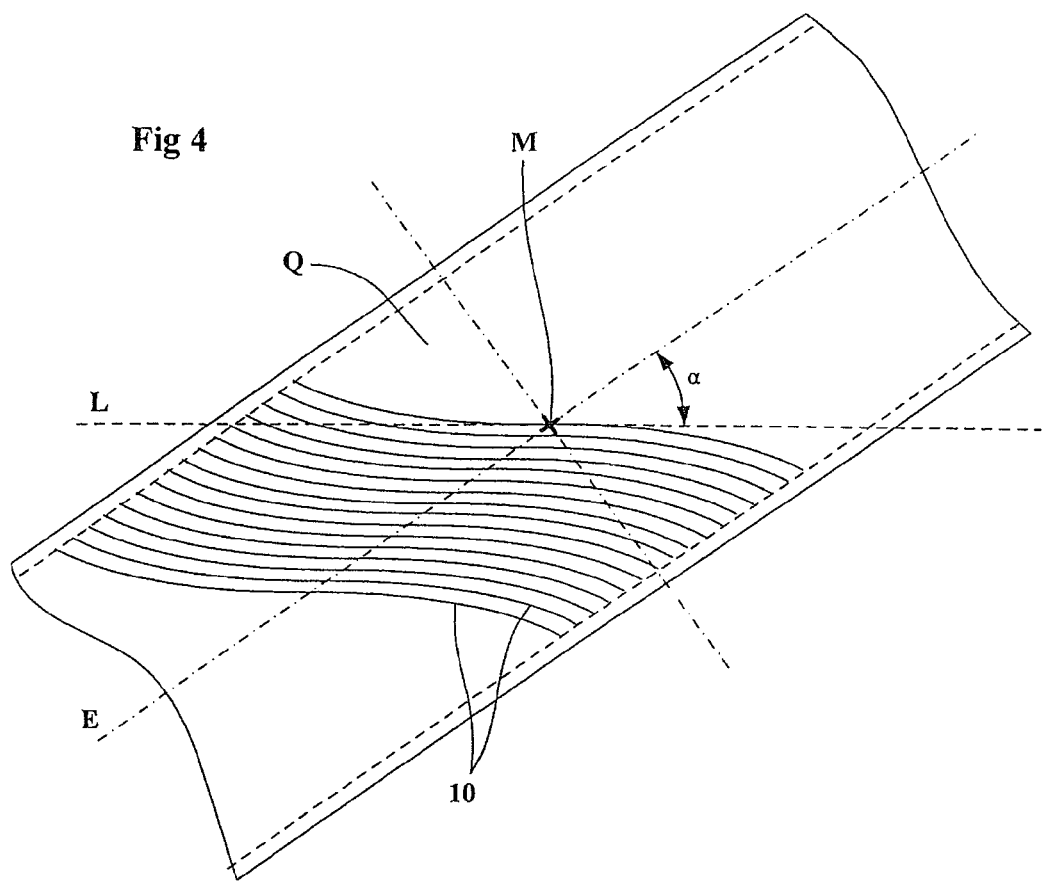
FIG. 4 shows a schematic view from above of a receiving surface onto which lengths of thread have been laid according to a particular embodiment.

Another application of this relationship between these parameters also proves to be particularly useful and relates to the scenario whereby the lengths of thread 10 are to be deposited on the receiving surface Q on each side of a line L as illustrated in FIG. 4.

As a general rule, and contrary to that which is illustrated in FIG. 4, the lengths of thread are positioned on the receiving surface Q and arranged parallel to one another in a substantially straight direction. The line L, which makes an angle α with the longitudinal direction E of the receiving surface Q, and the length of thread laid are then coincident. When the receiving surface consists of the crown of a tire this angle α corresponds to the crown reinforcement lay angle. As detailed in the publications cited in the introduction, steps are then taken to ensure that, on the one hand, the spray orifice 40 has, in its longitudinal direction, a straight shape and, on the other hand, the line of the plane P in which the conduit 2 moves over the receiving surface Q makes an angle α with the longitudinal direction E and coincides with the line L. The plane of rotation P then passes through the spray orifice 40.

In that particular scenario, when the guide is viewed in a direction which is transverse to the longitudinal direction of the slot and disposed in the plane P, each length of thread 10 is tangential to the line L at the point M, the point M being the intersection between the median longitudinal line E and the line L. The length of thread once laid draws out a kind of S-shape on each side of the line L, the line making an angle α with the median line E.

Figure 5:
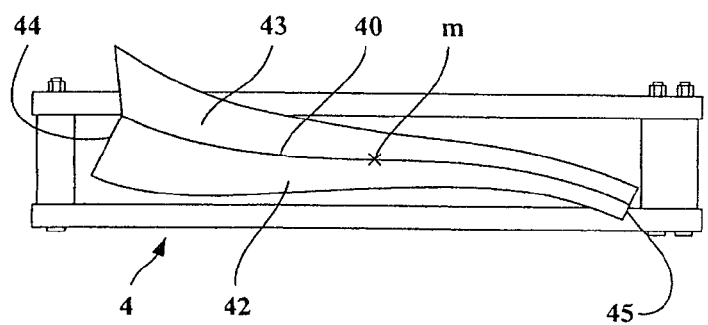
FIG. 5 shows a schematic view from above of a thread guide able to guide threads according to the particular embodiment.
Figure 6:
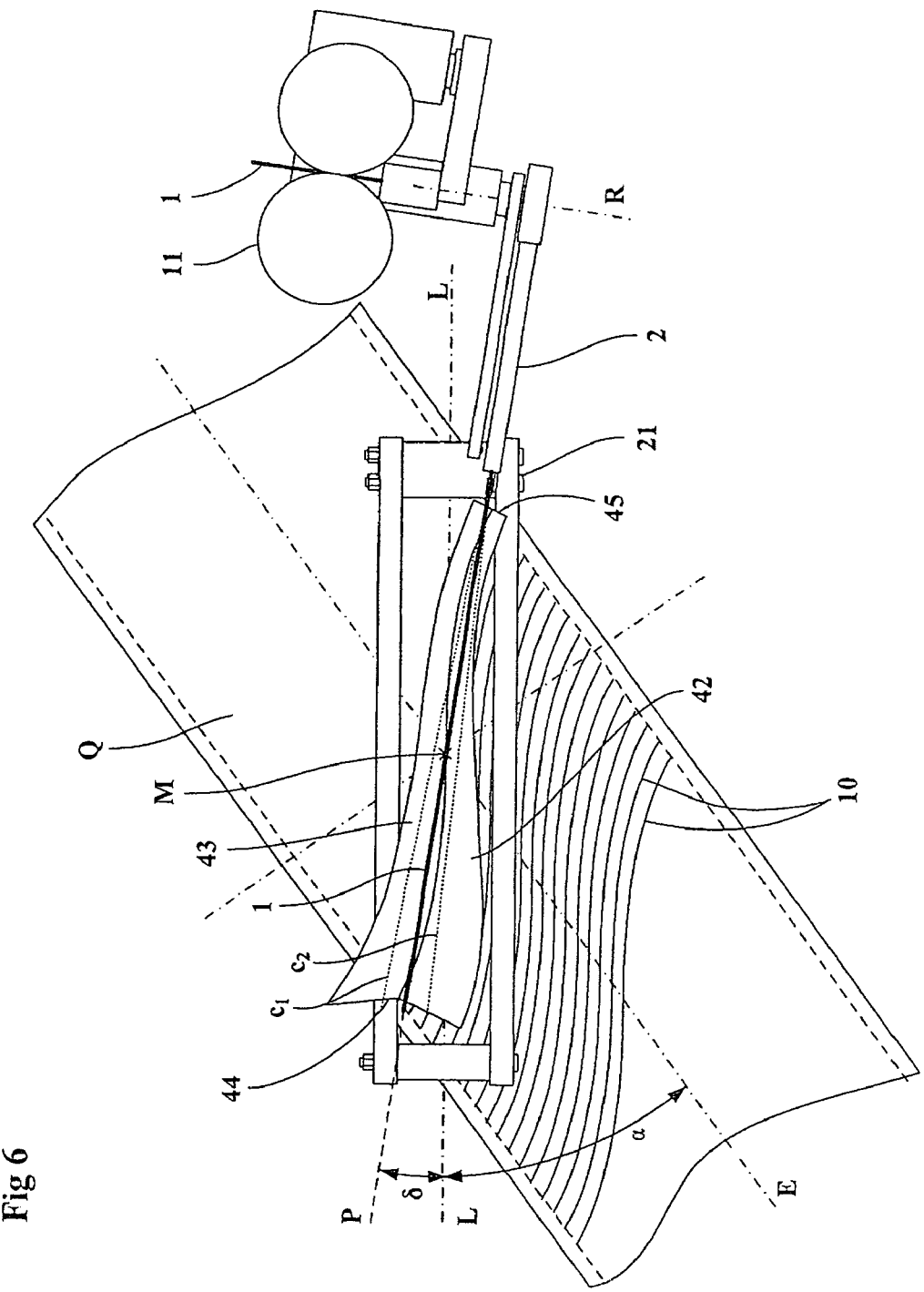
FIG. 6 shows a schematic view from above providing a visual indication of the particular arrangement of the receiving surface, of the thread guide and of the laying apparatus in the context of the particular embodiment.

It is then necessary to provide a thread guide, the longitudinal shape of the spray orifice 40 of which is designed to give the thread this S-shape. FIG. 5 illustrates the view from above of a thread guide 4 of this type, equipped with its two deflectors 42 and 43. The angular aperture θ between the deflectors ranges between 3° and 7° as explained earlier. The point on the thread guide through which the region of the length of thread intended to "land" at the point M passes is denoted m. This point m lies substantially mid-way between the ends 44 and 45.

The length and the nature of the length of thread to be laid determine the amplitude $a_{max}$ of the oscillation.

The thread guide is therefore positioned above the receiving surface Q, to a first approximation, in such a way that the spray orifice is positioned as close as possible to the receiving surface Q and that the point m is positioned substantially above the point M. In addition, the thread guide is directed in such a way that the tangent to the spray orifice 40 at the point m makes an angle α with the median line E.

According to the above teachings, the rotary conduit 2 needs to be arranged in such a way that the line of the intersection between the plane of rotation P and the receiving surface Q makes an angle α with the median line E, then the height h of the walls needs to be calculated such that the limits $c_1$ and $c_2$ fall within the aperture 41 of the upper edging of the thread guide. This, owing to the special shape of the spray orifice, leads to a substantial increase in the height h of the walls of the deflectors which, as has already been seen, leads to a loss in kinetic energy of the thread because of friction or impact with the walls of the deflectors.

It has been found that it was possible substantially to reduce this disadvantage by rotating the rotary conduit about the point m by an additional angle δ with respect to the line L, so that the plane P intersects the longitudinal line of the spray orifice near the ends 44 and 45 of the thread guide, and at the point m where the plane P is tangential to the line. The line of the spray orifice is the imaginary line passing at equal distances from the edgings of the walls of the deflectors 42, 43 at the spray orifice 40. It corresponds to the line of contact between the walls when the distance e is equal to zero.

All that then remains to be done is for the shape and the heights of the deflectors to be determined using the rules set out in the above paragraphs, and taking the amplitude of the oscillation of the thread into consideration, the value of which is obtained through experimental measurement, by using means as described here above. The height of the walls is then reduced as far as possible, as is the loss of kinetic energy of the thread as it passes through the thread guide.

The present description relates to the configuration in which the length of thread laid makes an S on each side of the line L. It will be seen that is also possible to lay lengths of thread that can adopt varying shapes about the line L, which are then not straight once they have been laid on the receiving surface Q. Those skilled in the art would therefore be able to adapt the orientation of the thread guide with respect to this line L in such a way that the two straight lines $C_1$ and $C_2$ which delimit the amplitudes of the oscillation of the thread on each side of the plane of rotation P fall within the inlet orifice 41 of the thread guide.

Another application relates to the possibility of using the various alternatives mentioned hereinabove with a view to determining a range of thread guides with geometries suited to the laying of threads of different natures and lengths, or which have different, although similar, amplitudes of oscillation. This makes it possible, by adjusting the choice of values for the angle and height carefully according to the product range to be manufactured, to limit the number of thread guides needed for manufacturing a wide variety of dimensions and threads.

The invention claimed is:

1. A device for manufacturing a reinforcement from threads by laying each thread directly in its final position by spraying a length of the thread onto a receiving surface, the device comprising:
   a feeder adapted to feed thread from a source of thread;
   a rotary conduit having an inlet end and an outlet end, the conduit mounted adjacent its inner end for rotation within a plane of rotation about an axis of rotation, wherein the outlet end is spaced from the inlet end in a direction oriented substantially radially with respect to the axis of rotation, the conduit arranged for receiving thread from the feeder and discharging the thread from the outlet end at a rate of advance controlled by the feeder,
   a driver for rotating the conduit about the axis;
   a thread cutter arranged to cut a length of thread for each revolution of the conduit; and
   a thread guide arranged for guiding the lengths of thread received from the conduit, the guide comprising two deflectors defining therebetween a slot having a longitudinal direction arranged generally in the rotation plane, the slot having inner and outer ends spaced apart in that longitudinal direction, wherein the inner end is disposed proximate the conduit's outlet end and the outer end is disposed remote from the conduit's outlet end, the slot including an inlet orifice for receiving thread lengths from the conduit, and a spray orifice for discharging the thread lengths, the inlet orifice and the spray orifice being spaced apart transversely of the longitudinal direction of the slot, wherein the deflectors approach one another toward the spray orifice at an angle $\theta$ such that the slot narrows towards the spray orifice; the angle $\theta$ when measured at any point between the inlet orifice and the spray orifice, being in the range of 3° to 7°.

2. The device according to clam 1 wherein the angle $\theta$ is substantially constant from the inlet orifice to the spray orifice.

3. The device according to claim 2 wherein the deflectors have a height dimension defined between the inlet orifice and the spray orifice; the height increasing in a direction from the inner end to the outer end of the slot.

4. The device according to claim 1 wherein the angle $\theta$ decreases toward the spray orifice.

5. The device according to claim 4 wherein the deflectors have a height dimension defined between the inlet orifice and the spray orifice; the height increasing in a direction from the inner end to the outer end of the slot.

6. The device according to claim 4 wherein the angle $\theta$ increases from the inner end to the outer end.

7. The device according to claim 1 wherein the separation between the deflectors at the inlet orifice at any given location between the outer and inner ends is greater than a range of oscillation of the thread lengths in a direction transversely of the rotation plane.

8. The device according to claim 7 wherein the deflectors have a height dimension defined between the inlet orifice and the spray orifice; the height dimension increasing toward the outer end of the slot.

9. The device according to claim 7 wherein the deflectors have a height dimension defined between the inlet orifice and the spray orifice, the height dimension being substantially constant from the inner end of the outer end of the slot.

10. The device according to claim 1 wherein the spray orifice is substantially linear in the slot's longitudinal direction.

11. The device according to claim 10 wherein the spray orifice lies in the rotation plane.

12. The device according to claim 1 wherein the spray orifice is non-linear in the slot's longitudinal direction.

13. The device according to claim 12 wherein the spray orifice is generally S-shaped in the slot's longitudinal direction.

14. The device according to claim 12 wherein a separation between the deflectors at the inlet orifice at any given location between the slot's outer and inner ends being greater than a range of oscillation of the thread lengths in a direction transversely of the rotation plane.

15. The device according to claim 14 wherein the guide is so positioned relative to the conduit that when the guide is viewed in a direction perpendicular to the slot's longitudinal direction and within the rotation plane, the rotation plane is tangential to the spray orifice at a point substantially midway between the slot's inner and outer ends and intersects the spray orifice at locations adjacent the inner and outer ends, respectively.

16. A method of applying reinforcement to a tire using the device according to claim 1.

\* \* \* \* \*